Figure 1:
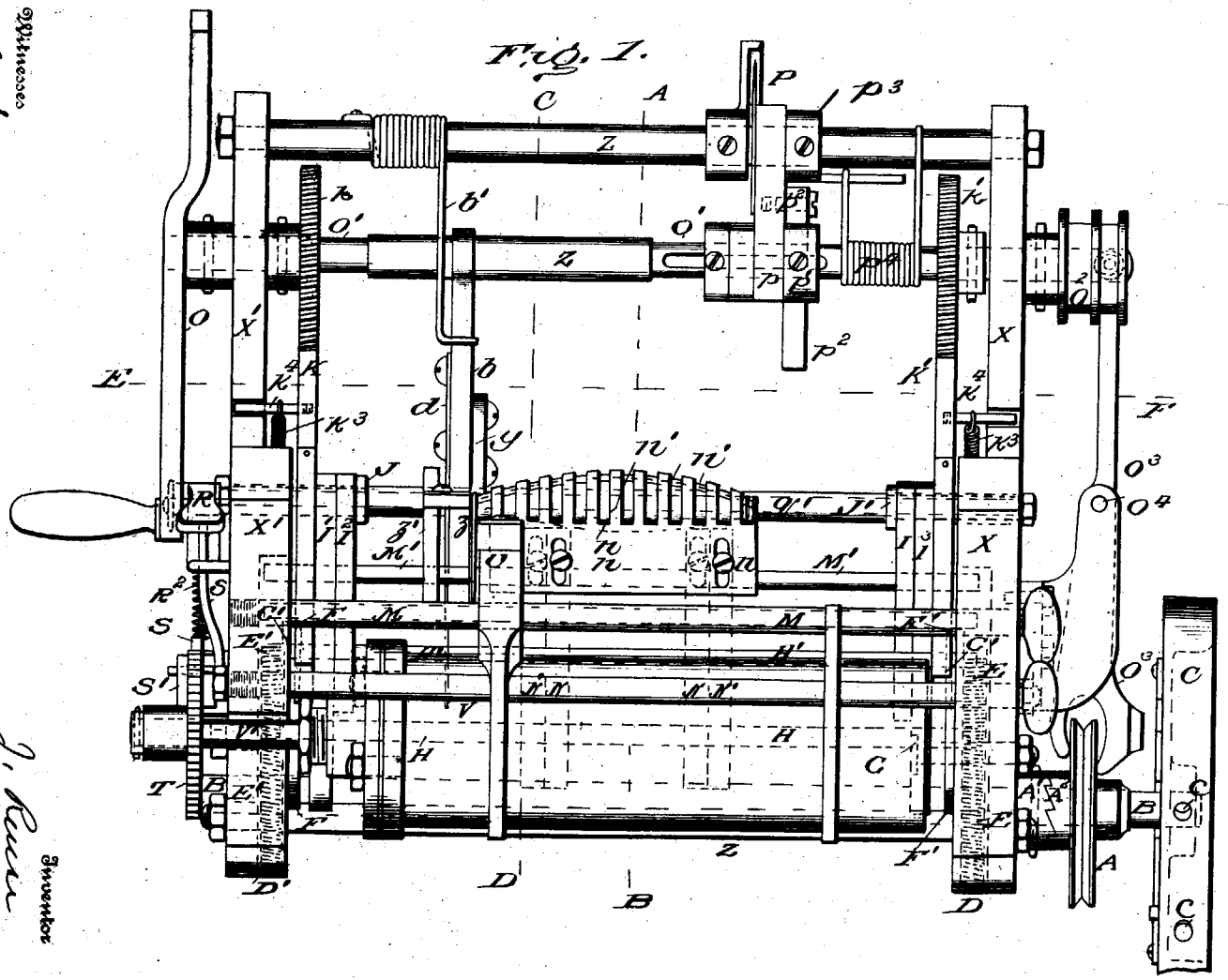

No. 11,695. Reissued Sept. 20, 1898.

J. REUSE.

CIGAR MACHINE.

(Application filed Dec. 30, 1897.)

9 Sheets—Sheet 1.

Witnesses

Chas. H. Davis.

Inventor

J. Reuse

By W. A. Bartlett,

Attorney.

No. 11,695.

Reissued Sept. 20, 1898.

J. REUSE.

CIGAR MACHINE.

(Application filed Dec. 30, 1897.)

9 Sheets—Sheet 2.

Witnesses.

Jno. Maire

Chas. K. Davies.

Inventor

J. Reuse

By W. A. Barlett

Attorney

No. 11,695.

Reissued Sept. 20, 1898.

J. REUSE.

CIGAR MACHINE.

(Application filed Dec. 30, 1897.)

9 Sheets—Sheet 3.

Witnesses

Jno. Quinn

Chas. K. Davies.

Inventor

J. Reuse

By W. A. Bartlett

Attorney

No. 11,695.

Reissued Sept. 20, 1898.

J. REUSE.

CIGAR MACHINE.

(Application filed Dec. 30, 1897.)

9 Sheets—Sheet 4.

Witnesses

Jas. Smith

Chas. K. Davies

Inventor

J. Reuse

By W. A. Bartlett

Attorney

No. 11,695.

Reissued Sept. 20, 1898.

J. REUSE.

CIGAR MACHINE.

(Application filed Dec. 30, 1897.)

9 Sheets—Sheet 5.

Witnesses

Jno Irvine

Chas. K. Davies.

Inventor

J. Reuse

By W. A. Bartlett

Attorney

No. 11,695.
Reissued Sept. 20, 1898.
J. REUSE.
CIGAR MACHINE.
(Application filed Dec. 30, 1897.)
9 Sheets—Sheet 6.
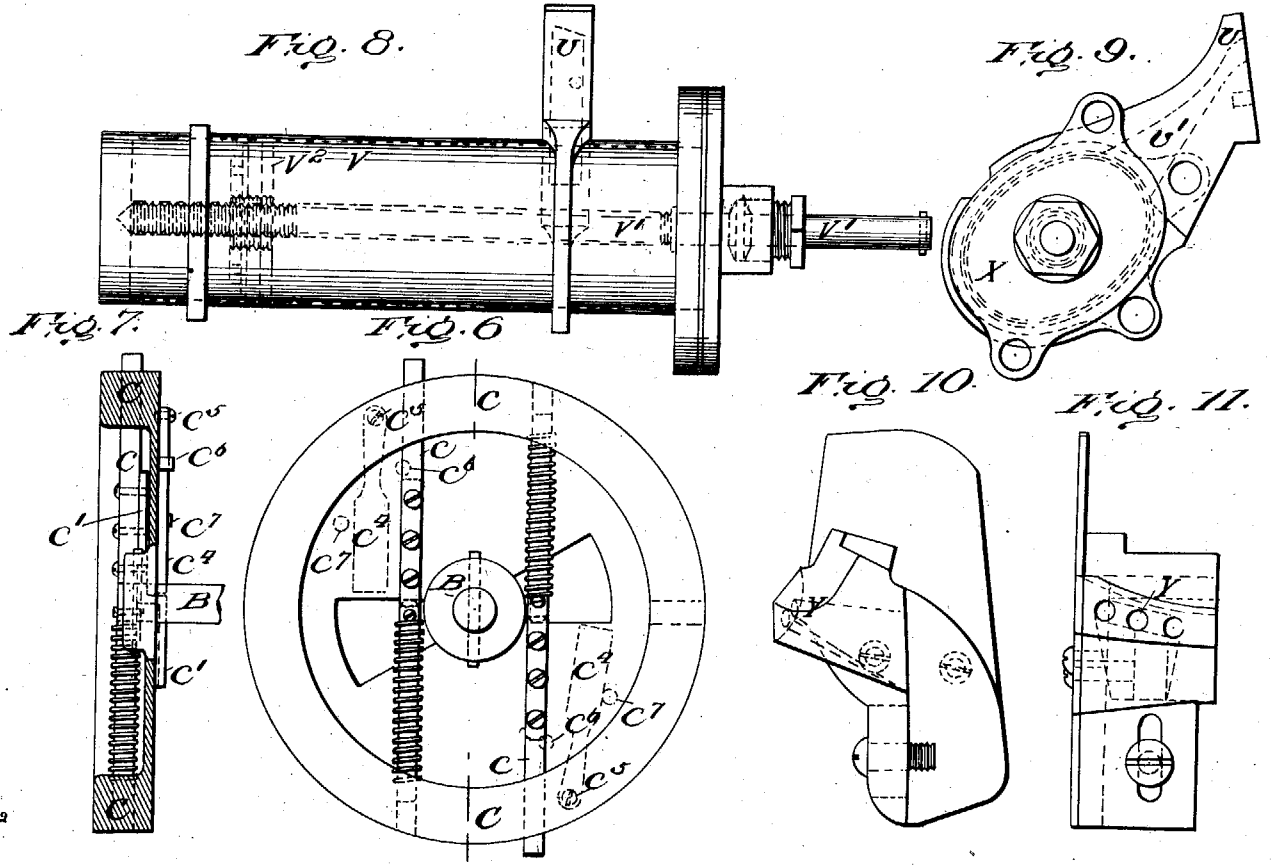
Witnesses
Jno Devine
Chas K. Davies.
Inventor
J. Reuse
By W. A. Bartlett
Attorney No. 11,695. Reissued Sept. 20, 1898.

J. REUSE.

CIGAR MACHINE.

(Application filed Dec. 30, 1897.)

9 Sheets—Sheet 7.

Witnesses

Jas. Bruce

Chas. R. Davies.

Inventor

J. Reuse

By W. A. Bartlett

Attorney

No. 11,695.
Reissued Sept. 20, 1898.
J. REUSE.
CIGAR MACHINE.
(Application filed Dec. 30, 1897.)
9 Sheets—Sheet 8.
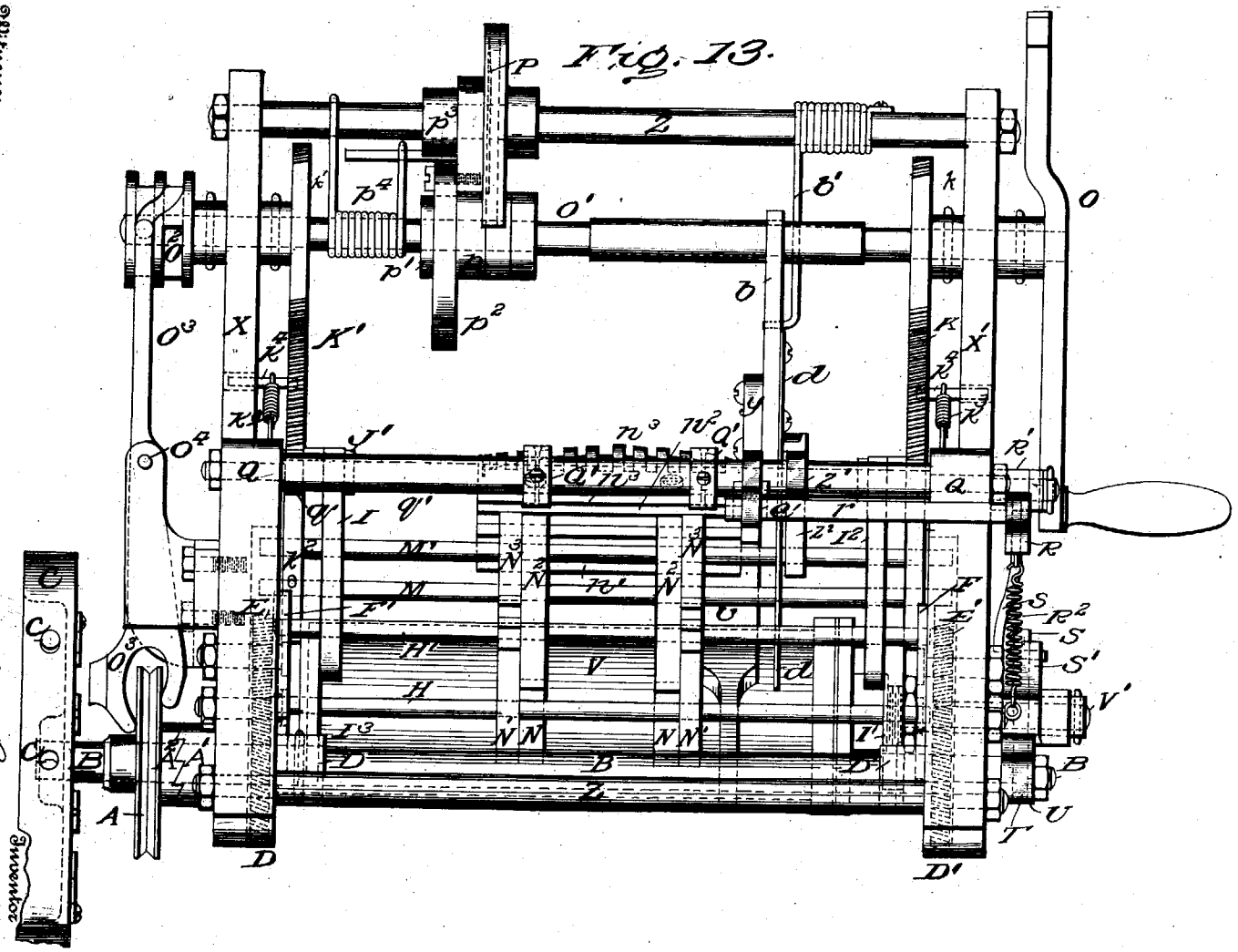
Witnesses
Jas. Spence
Chas. K. Davis
Inventor
J. Reuse
By W. A. Bartlett
Attorney No. 11,695. Reissued Sept. 20, 1898.

J. REUSE.

CIGAR MACHINE.

(Application filed Dec. 30, 1897.)

9 Sheets—Sheet 9.

Witnesses

Jno Minie

Chas. K. Davies.

Inventor

J. Reuse

By W. A. Bartlett

Attorney

UNITED STATES PATENT OFFICE.

JEAN REUSE, OF ENGHIEN, BELGIUM, ASSIGNOR, BY MESNE ASSIGNMENTS, TO THE SOCIÉTÉ ANONYME D'EXPLOITATION DES BREVETS REUSE AUX ETATS UNIS D'AMERIQUE, OF BRUSSELS, BELGIUM.

CIGAR-MACHINE.

SPECIFICATION forming part of Reissued Letters Patent No. 11,695, dated September 20, 1898.

Original No. 552,447, dated December 31, 1895. Application for reissue filed December 30, 1897. Serial No. 664,753. Patented in Belgium May 19, 1892, No. 99,731, and January 9, 1894, No. 108,013; in France January 9, 1894, No. 235,405; in Spain January 9, 1894, No. 15,356; in England February 19, 1894, No. 3,572; in Turkey April 21, 1894, No. 401; in Luxemburg May 31, 1894, No. 2,038; in Norway May 31, 1894, No. 3,701; in Portugal June 6, 1894, No. 1,889; in Switzerland June 9, 1894, No. 8,789; in India June 21, 1894, No. 181; in Austria July 14, 1894, No. 44/3,206; in Italy September 30, 1894, No. 36,824; in Cape Colony October 4, 1894, No. 390; in Victoria October 9, 1894, No. 11,749; in Queensland October 12, 1894, No. 2,792; in New Zealand October 30, 1894, No. 7,237; in Tasmania November 19, 1894, No. 1,363; in Congo Free State November 30, 1894, No. 29; in Western Australia December 19, 1894, No. 558; in South African Republic January 10, 1895, No. 778; in Canada January 21, 1895, No. 47,960; in South Australia February 11, 1895, No. 3,740; in Mexico February 12, 1895, No. 661; in Jamaica February 18, 1895; in Hungary March 21, 1895, No. 2,436; in Argentine Republic May 20, 1895, No. 1,602; in Guatemala June 3, 1895, No. 41; in Colombia June 14, 1895, No. 687; in Brazil August 14, 1895, No. 1,729, and in Germany November 2, 1895, No. 83,898.

*To all whom it may concern:*

Be it known that I, JEAN REUSE, of Enghien, Belgium, have invented certain new and useful Improvements in Cigar-Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

Letters Patent were granted to me or my representatives for this invention in Belgium, dated May 19, 1892, No. 99,731, and January 9, 1894, No. 108,013; in France, dated January 9, 1894, No. 235,405; in Spain, dated January 9, 1894, No. 15,356; in Great Britain, dated February 19, 1894, No. 3,572; in Austria, dated July 14, 1894, No. 44/3,206; in Hungary, dated March 21, 1895, No. 2,436; in Portugal, dated June 6, 1894, No. 1,889; in Turkey, dated April 21, 1894, No. 401; in Luxemburg, dated May 31, 1894, No. 2,038; in Norway, dated May 31, 1894, No. 3,701; in Switzerland, dated June 9, 1894, No. 8,789; in Italy, dated September 30, 1894, No. 36,824; in Canada, dated January 21, 1895, No. 47,960; in Mexico, dated February 12, 1895, No. 661; in Brazil, dated August 14, 1895, No. 1,729; in the Argentine Republic, dated May 20, 1895, No. 1,602; in India, dated June 21, 1894, No. 181; in Cape Colony, dated October 4, 1894, No. 390; in Victoria, dated October 9, 1894, No. 11,749; in Queensland, dated October 12, 1894, No. 2,792; in South Australia, dated February 11, 1895, No. 3,740; in New Zealand, dated October 30, 1894, No. 7,237; in Western Australia, dated December 19, 1894, No. 558; in Tasmania, dated November 19, 1894, No. 1,363; in Guatemala, dated June 3, 1895, No. 41; in the United States of Colombia, dated June 14, 1895, No. 687; in the South African Republic, dated January 10, 1895, No. 778; in the Congo Free State, dated November 30, 1894, No. 29; in Jamaica, dated February 18, 1895, and in Germany, dated November 2, 1895, No. 83,898.

My invention has for its object the construction of a machine by means of which cigars may be manufactured with great speed and in such a manner as to be as well made as if coming from the hands of a competent cigar-maker. I attain this result by a combination of mechanism the action of which somewhat resembles the manual operations of a cigar-maker and without the employment of feeding-aprons or compressing-rollers, often employed in so-called "cigar-machines."

The machine consists, essentially, of the following mechanism or parts: first, manipulators formed of two pairs of jaws, which give to the fillings or inside of the cigar, usually formed of tobacco-leaves, the shape desired for the reception of the covering-leaf and subsequently wrap the latter around the fillings, at the same time fashioning the cigar throughout its length; second, disconnecting mechanism for stopping the machine almost instantaneously; third, mechanism for removing the finished cigar from the manipulators; fourth, a knife for cutting the cigars to the desired length and for removing the excess of tobacco at the thick end; fifth, a knife which removes the excess of tobacco at the point end or tip of the fillings; sixth, a tip-former consisting of a fixed part and a movable part; seventh, a gum-pump, with mechanism for feeding the gum to the tip of the cigar.

In order that my invention may be the better understood, I will now successively describe each of the said parts with reference to the accompanying drawings, which represent the views and parts of my machine hereinafter stated.

Figure 2:
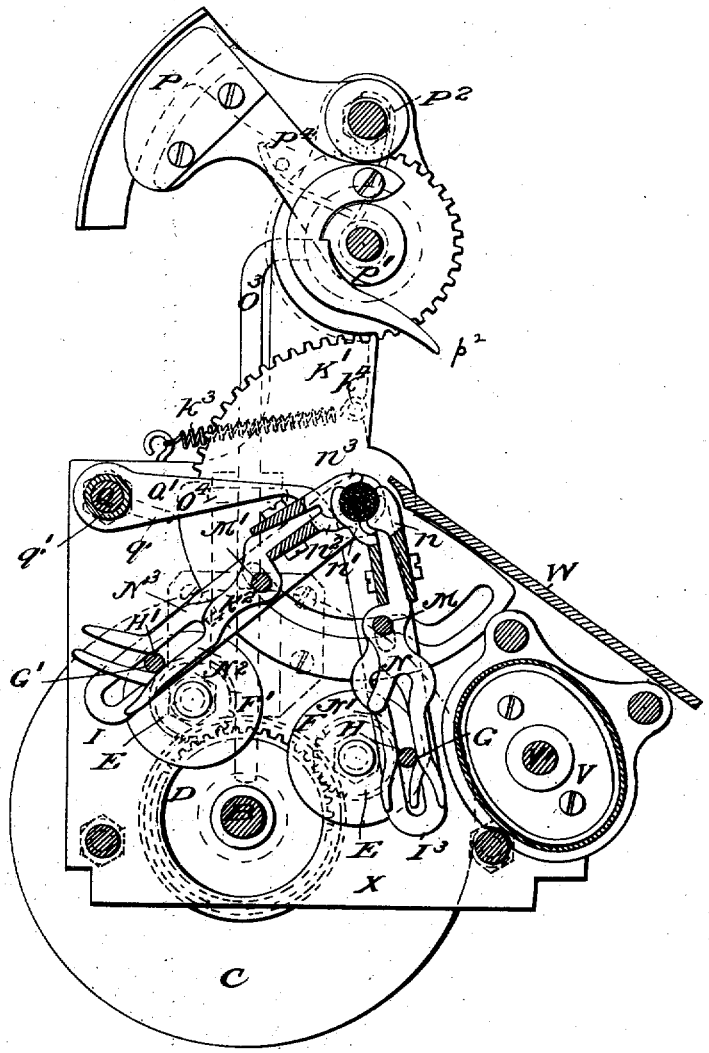
Figure 3:
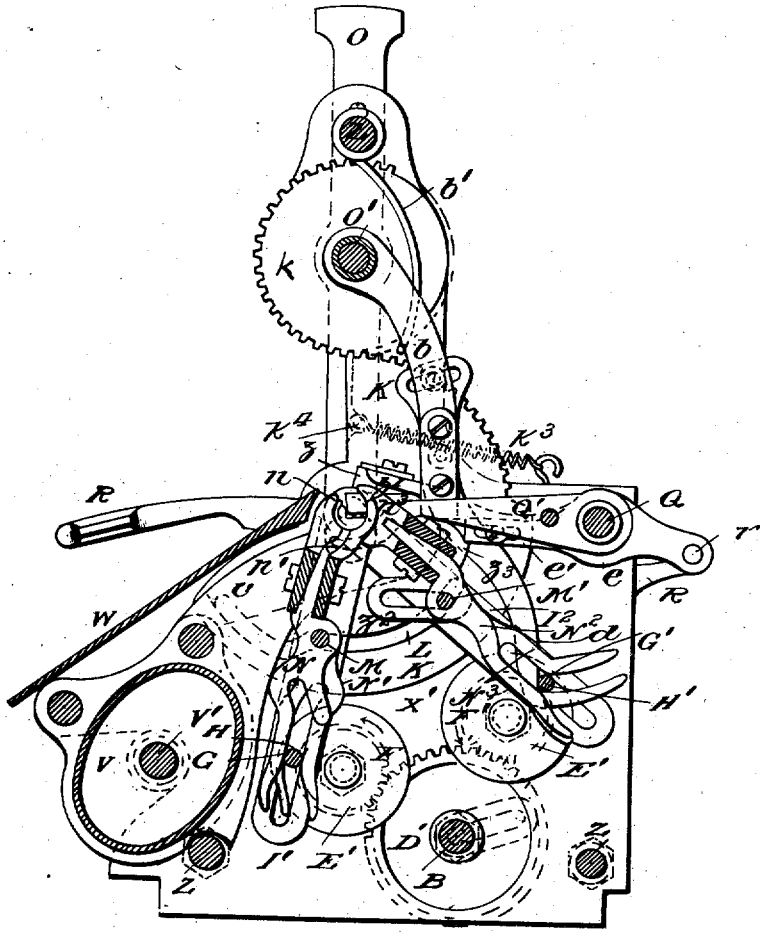
Figure 4:
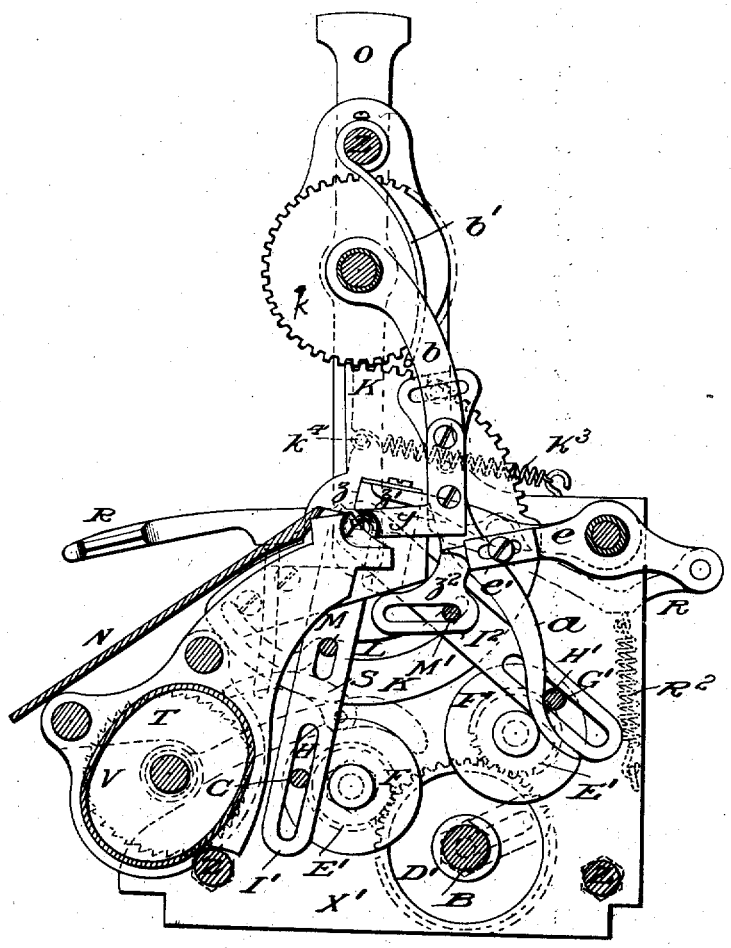
Figure 5:
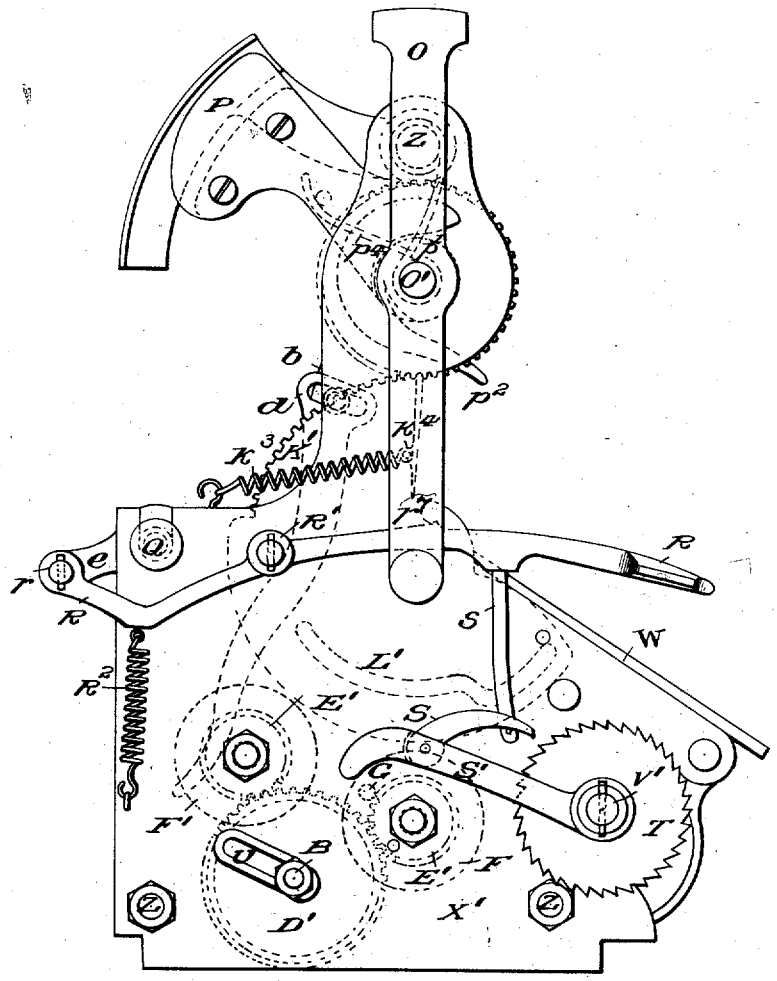
Figure 72:
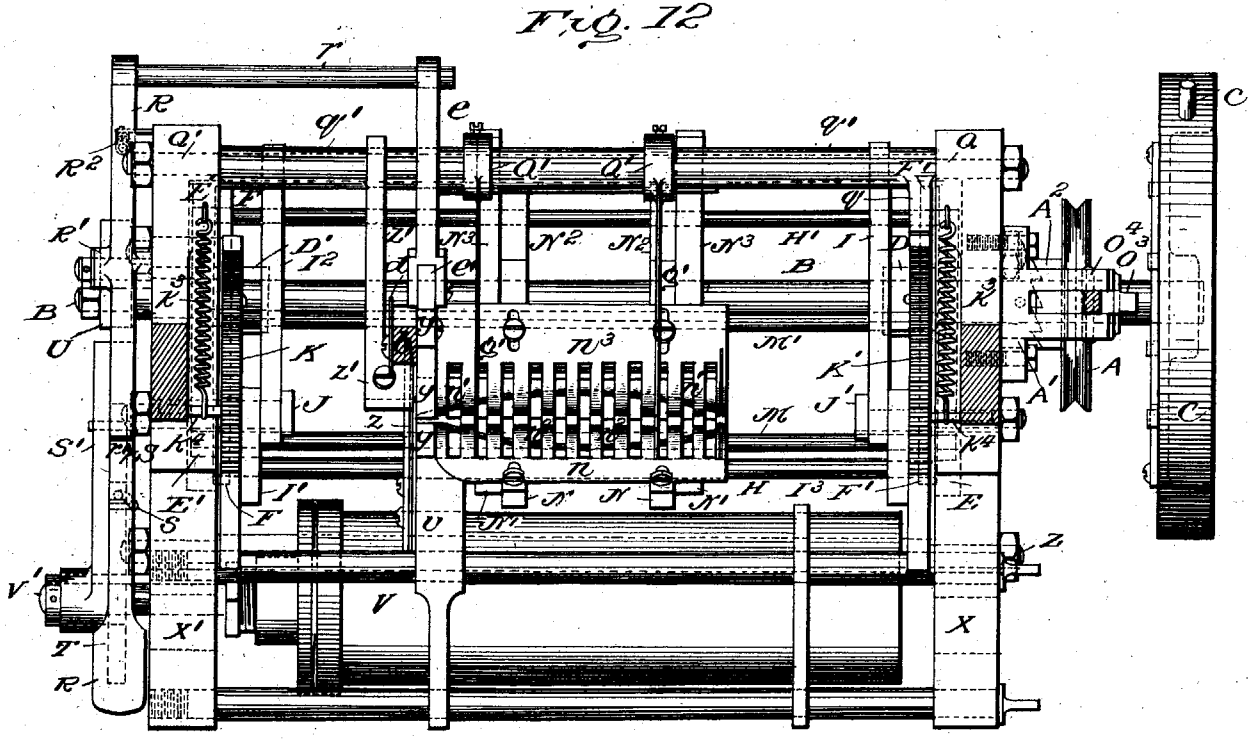
Figure 14:
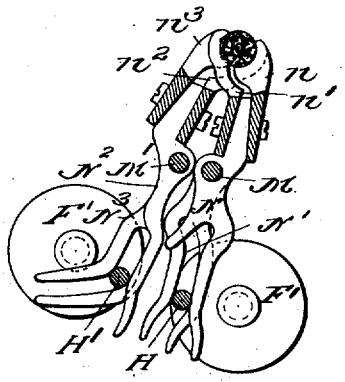
Figure 15:
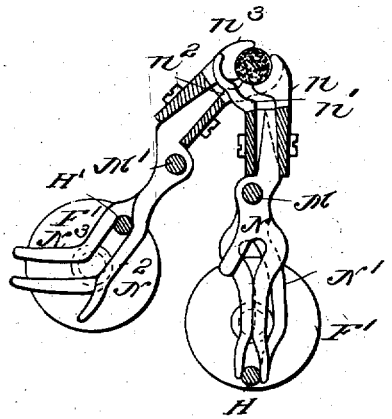
Figure 16:
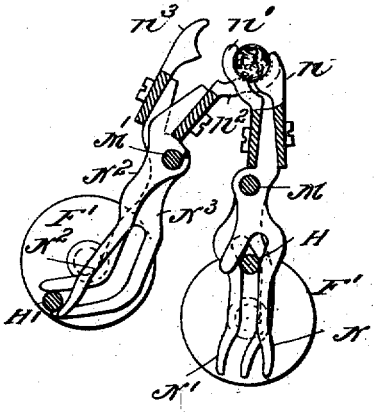
Figure 17:
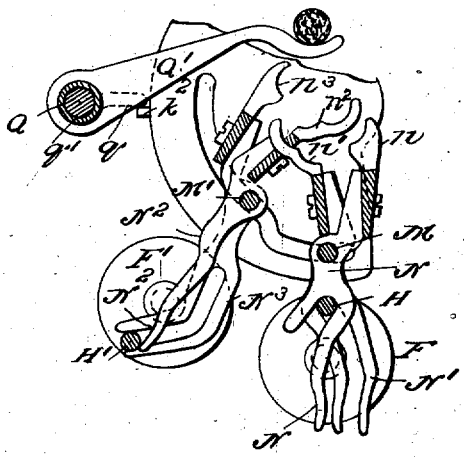

Figure 1 is a front elevation showing a general view of the machine, the plate which covers the front of the same up to the manipulators being removed. Fig. 2 is a section of the same, taken on the line A B, Fig. 1, looking toward the fly-wheel. Fig. 3 is a section taken on the line A B, Fig. 1, looking toward the crank-handle. Fig. 4 is a section on the line C D, Fig. 1, looking toward the crank-handle. Fig. 5 is a side elevation of the machine, taken from the crank-handle side. Fig. 6 is an elevation of the outer side of the fly-wheel. Fig. 7 is a central transverse section of the same. Fig. 8 is a front view of the pump. Fig. 9 is an end view of the same. Fig. 10 is a detached view of the fixed half of the tip-former, the said view being taken from the fly-wheel side. Fig. 11 is a plan view of the same. Fig. 12 is a plan view of the machine, partly in section, on the line E F, Fig. 1. Fig. 13 is a back view of the machine. Figs. 14, 15, 16, and 17 are detached views showing different positions of the manipulators.

In the said figures, X X′ are the side standards or uprights of the machine, connected together by tie-rods Z Z Z.

B is the driving-shaft, which carries a fly-wheel C and receives motion from a pulley A, actuated by a crank-handle or by a treadle or by any other suitable means.

D D′ are two toothed wheels mounted on the shaft B, each at one end thereof, between the uprights X X′, and E E are two toothed wheels gearing with the wheel D, and E′ E′ are two corresponding toothed wheels gearing with the wheel D′. Each of the wheels E E E′ E′ carries a plate or disk, in the inner face of which a hole is formed, the several plates being marked F F F′ F′ and the several holes G G G′ G′.

H H′ are two spindles or rods parallel to the shaft B. The ends of the spindle H engage freely in the holes G G of the plates F F, and the ends of the spindle H′ engage in the holes G′ G′ of the plates F′ F′.

I $I^2$ and I′ $I^3$ are two pairs of guides oscillating, respectively, upon pivots J J′, carried by the uprights X X′, each of which guides has a slot at its lower part. Before entering the holes G G the spindle H passes through the slots of the guides I′ $I^3$, and in like manner the spindle H′ passes through the slots of the guides I $I^2$. Consequently when the spindles H H′ are carried around by the plates F F′ they cause the guides I I′ $I^2$ $I^3$ to oscillate upon their pivots J J′.

K is a cam-plate a portion of which is of the form of a toothed sector, which plate is carried by the pivot J, and K′ is a similar cam-plate carried by the pivot J′. In these plates are formed corresponding partly eccentric cam grooves or slots L L′, in which are engaged the ends of two fulcrum-bars, spindles or rods M M′, parallel to the rods H H′, which pass through the guides I I′ $I^2$ $I^3$, from which they receive oscillatory motion. It will be noticed by reference to Figs. 2 and 4 that the front spindle M passes through small slots in the guides I′ $I^3$, which allows the said spindle M to have a small amount of play in a vertical direction. The spindles M M′ serve as pivots for the levers N N′ $N^2$ $N^3$, the short upper arms of which carry the manipulators $n$ $n'$ $n^2$ $n^3$, respectively, while their lower ends are of the form of bent forks, between the branches of which forks the rods H H′ slide. These levers and the manipulators which they carry are arranged in two pairs, one set comprising the levers N N′, mounted on the spindle M and engaged with the spindle H, and the other set comprising the levers $N^2$ and $N^3$, mounted on the spindle M′ and engaged with the spindle H′.

Each manipulator consists of a plate screwed upon the lever which carries it and the acting upper part of which is cut into a series of tongues hollowed on the inner side more or less deeply in such manner that their combination forms a mold for the cigar. The spaces between the manipulator-tongues are so formed and disposed that the tongues of one pair of manipulators enter the spaces of the other pair, and vice versa.

The lower arms of the levers carrying the manipulators and the slots therein are of such form that the resultant of the continuous circular motion of the rods H H′ in the slots of the said arms and the alternate curvilinear motion of the spindles M M′, constituting the fulcra of the said levers, produces alternate opening and closing of each pair of jaws or manpiulators. Moreover, the closing motion of each pair coincides with the upward motion of one of the manipulators and the downward motion of the other. Hence when one of the pairs of manipulators opens the other pair closes and clasps the fillings, causing them to turn slightly upon their own axis while they are being held. The open pair then closes gradually in order in its turn to clasp the fillings as the first pair is opening. The closing pair of manipulators by its compound movement gives a partial rotation to the filler or the cigar which may be in the manipulators. The space between the manipulators being about in line with the pivots J J′, any movement of the manipulator-guides about the axial line of such pivots must be perpetuated, although in modified form or extent, to the manipulators themselves. The fillings are thus continually rotated upon their own axis until the cigar is finished.

O is a crank-handle secured to one end of a shaft O′, carrying at the other end an eccentric $O^2$, which is engaged by one end of a lever $O^3$, oscillating upon a pivot $O^4$, the other end of which lever has the shape of a fork, between the branches of which the upper part of the driving-pulley A turns. The said pulley is mounted on a sleeve A′, provided with teeth, forming one half of a clutch, the other half $A^2$ of which is keyed on the driving-shaft B.

When the crank-handle O is turned one-quarter of a revolution by pulling it and raising it toward the front of the machine, the eccentric $O^2$ follows the same motion, and the top of the lever $O^3$, by sliding in the helicoidal groove formed in the periphery of the said eccentric, (see Fig. 13,) is brought sufficiently near to the upright X of the machine for the fork at its other end to draw back the pulley A while receding from the upright X, thus throwing the machine out of gear.

Upon the shaft O′ are keyed two partially-toothed wheels $k$ $k'$, the teeth of which gear (while the crank-handle is being turned in the manner above described) with those of the cam-plates K and K′ and turn the latter through a small angle toward the front of the machine. The slots L L′ are thus caused to recede, the rods M M′, which are engaged with the said slots, being held stationary in consequence of the stoppage of their guides I I′ $I^2$ $I^3$, caused by the stoppage of the driving-gear. Then when the crank-handle O is further turned through another quarter of a revolution the toothed wheels $k$ $k'$ cause the cam-plates K K′ to turn more, the slots L L′ therein continuing to recede, so that the front spindle M soon meets the inclined part of the said slots L L′, and in consequence of its freedom to descend in the vertical slots of the guides I $I^3$ said spindle or fulcrum-bar passes along this inclined part as far as the lower part of the slots L L′. The levers N N′ and their manipulators $n$ $n'$, carried by the spindle M, follow its downward motion, and the manipulators $n$ $n'$, which were closed upon the cigar, now open as they descend. The two pairs of manipulators being thus opened, the finished cigar may be removed therefrom. (See Fig. 17.) On the turning of the crank-handle O being then continued until its motion is arrested by contact of the spindle M with the end of the lower part of the slots L L′ a lug $k^2$ on the periphery of the cam-plate K′ raises a small lever $q$, fixed on a sleeve $q'$ on the shaft Q, which sleeve $q'$ carries a pair of levers Q′ Q′, which extend forward under the cigar between the tongues of the manipulators. The raising of this lug $k^2$ produces partial backward rotation of the sleeve $q'$ and of the pair of delivery-levers Q′, which, passing between the tongues of the open manipulators, raise the cigar and permit of its ready removal. If the crank-handle be then brought forward, the cam-plates K K′ and the lug $k^2$ will move backward, and the lever $q$ will be lowered by its spring $q^2$, and the pair of levers Q′ will be depressed, when the tobacco required to form the inside or fillings of the cigar to be next made may be introduced between the open manipulators. On the crank-handle O being then lowered toward the front of the machine the cam-plates K K′ are caused to complete their backward rotation by the action of the toothed wheels $k$ $k'$ and of the springs $k^3$ $k^3$, which are each secured at one end to the rear part of the uprights X X′ and at the other to a stop $k^4$ $k^4$, projecting from the outer face of the cam-plates K K′. When these stops come in contact with the uprights X X′, the backward rotation of the cam-plates K K′ is arrested, the spindle M having then returned to the upper portion of the slots L L′ and to the top of the slots of the guides I′ $I^3$, and as the eccentric $O^2$ follows the rotation of the shaft O′ it moves the upper end of the lever $O^3$ away from the upright X, the said lever being thus caused to oscillate upon its pivot $O^4$, whereby its lower end is moved toward the upright X, bringing the pulley A back with it and throwing the machine into gear.

When the two pairs of manipulators are open to allow of the insertion of tobacco, the crank-handle O is prevented from descending by a small projection $r^7$ on a spring-lever R, against which projection the part of the cranked handle extending beyond the shaft O′ bears.

The crank-handle and its connecting mechanism, as described, whereby the manipulator-jaws are opened and the cigar delivered therefrom, may be called the "actuator" mechanism, since by this train the delivery device is actuated and the jaw-driving mechanism is disconnected, so that the delivery may be effected. By this actuating-train and connections also the cutting is effected, as will be described.

When the pulley A is disconnected, it is important that the fly-wheel C and the shaft B be instantaneously stopped by a brake mechanism. For this purpose the fly-wheel C is provided on its outer face with two parallel rods $c$ $c$, sliding within openings formed in the fly-wheel flange. To each of these rods is fixed a cranked bar $c'$ $c'$, the free part of which passes through an opening in the fly-wheel and bears on its inner face and the cranked part of which bar forms a shoulder upon each side of the fly-wheel. The shoulder on the part of the said bar which lies on the outer face of the fly-wheel bears against a pin passed through the rod $c$ and forming a stop against which one end of a spring coiled upon the said rod $c$ bears, the other end of which spring bears against the flange of the fly-wheel. The shoulder on the part of the bar $c'$ which lies on the inner face of the fly-wheel comes in contact with a projection on the outside of the lower end of the fork of the lever $O^3$ when the pulley A is disconnected. The inner face of the fly-wheel is, moreover, furnished with a tumbler $c^4$, turning upon a pivot $c^5$ between two stops $c^6$ $c^7$.

When the pulley A is disconnected, the projection of the fork $O^3$ meets with one or other of the tumblers $c^4$, which it raises until it bears against the stop $c^7$. The said projection then comes in contact with the inner shoulder of the cranked bar $c'$ and pushes it back, compressing the spring of the rod $c$ until the fly-wheel stops. In pushing back the bar $c'$ the projection of the fork $O^3$ frees the tumbler $c^4$, which as it drops on the stop $c^6$ comes behind the said projection, and thus prevents the fly-wheel from being turned backward by the expansion of the spring. On the pulley A being reconnected in order to set the machine in motion the fork $O^3$ as it nears the upright X becomes disengaged from the shoulder of the cranked bar $c'$, which under the action of the spring returns to its original position, and the fly-wheel is free to rotate with the pulley A. As the fly-wheel is provided with two similar stop mechanisms diametrically opposite one another, it can only accomplish half a revolution at the utmost after the pulley A is disconnected.

On the shaft O′, which is actuated by the crank-handle O, is loosely mounted a sleeve $p$, carrying a knife P, the office of which is to cut off the excess of tobacco at the thick end of the cigar, and on the said shaft by the side of the sleeve $p$ a cam-shaped sleeve $p'$ is keyed. (See Figs. 2 and 5.) A curved pawl $p^2$ is jointed to the same side of the sleeve $p$ in such a manner as to partially surround the cam-shaped sleeve $p'$, the inner face of which pawl $p^2$ is so shaped as to correspond exactly to the shape of the sleeve $p'$.

When the crank-handle O is turned in order to disengage the pulley A, the shaft O′ carries with it in its rotation the sleeve $p'$, the eccentric part of which being engaged with the corresponding part of the pawl $p^2$ carries the latter with it as it rotates and also the sleeve $p$, to which the knife P is secured. The said knife is thus lowered sufficiently to cut off the excess of tobacco at the thick end of the cigar. The prolongation at the free end of the pawl $p^2$ now abuts against the sleeve $p^3$, keyed on the upper tie-rod Z. The shaft O′ continuing to rotate, the said sleeve $p'$ turns in the pawl $p^2$, which is arrested by the sleeve $p^3$, and as the said sleeve $p'$ turns its eccentric part becomes disengaged from the notch of the pawl $p^2$, which is thus freed with the sleeve $p$ and the knife P, the said parts being brought back to their original positions by the spring $p^4$.

$z$ is a small knife secured to one arm $z'$ of a lever $z^3$ on the shaft Q. In the other arm $z^2$ of this lever a slot is formed, into which the spindle M′ of the manipulators passes. During the working of the manipulators the spindle M′, to which a curvilinear motion is imparted in the slots L L′, travels in the slot of the lever-arm $z^2$ and communicates an upward-and-downward reciprocating motion to the lever $z'$ $z^2$ and to its knife $z$. The knife $z$ cuts a slit in the wrapper, near the end thereof, which causes the wrapper to wind in a different manner from what would be the case without the slit. This slit in the wrapper is common in hand-made cigars.

Y is a piece fixed to the end of a support $v$, the inner face of which is hollowed so as to form about a half of the tip-former, and $y$ is a movable piece, the end of which is also hollowed to form the other half of the said tip-former. (See Fig. 4.) This piece $y$ is fixed to a lever $b$, oscillating upon the shaft O′, and pressed toward the rear of the machine by a spring $b'$, fixed to the tie-rod Z. The pieces Y and $y$ together make the tip-former or mold.

R is a lever extending along the outside of the upright X′ from the front to the rear of the machine. This lever works on a pivot R′, fixed in the upright X′, and its rear end carries one end of a small rod $r$, which extends along a portion of the rear end of the machine. The other end of this rod $r$ is fixed in the end of the rear arm of a lever $e$, oscillating upon the shaft Q, the front arm of the said lever (which extends as far as under the movable piece $y$) carrying an adjustable piece $e'$, forming a shoulder on the top of the said front arm of the lever $e$. A spring $R^2$, attached at one end to the rear of the upright X′ and at its other end to the bottom of the rear arm of the lever R, tends to hold down this rear arm, and with it the rod $r$ and the rear arm of the lever $e$, the front arm of which, carrying the shoulder $e'$, is then in its highest position. In this position of the levers R and $e$ the rear end of the movable piece $y$ bears against the shoulder $e'$ of the lever $e$, which then prevents the said piece $y$ and the lever $b$ from moving; but if during the working of the manipulators the hand is pressed slightly on the front end of the lever R its rear arm is raised, and with it the rod $r$ and the rear arm of the lever $e$, the front arm of which then descends sufficiently to disengage its shoulder $e'$ from the back of the piece $y$. By the action of the spring $b'$ the lever $b$, the piece $y$, and the guide $d$ are then pushed toward the back of the machine until the guide $d$ meets the spindle H′, against which it is held by the said spring $b'$. The spindle H′ in rotating with the plates F F′ slides against the tail of the guide $d$, and the latter is alternately pushed forward by the spindle H′ when the latter turns toward the front of the machine and brought back by the spring $b'$ when the spindle H′ rotates toward the rear of the machine. Hence the guide $d$, the lever $b$, and the movable piece $y$ will oscillate on the shaft O′, producing a to-and-fro motion of the hollowed end of the piece $y$ against the tip of the fillings.

V is the pump which supplies the gum required for causing the external leaf to adhere to the tip of the cigar.

$V^2$ is the piston and V′ the rod of the pump, which rod is screw-threaded and extends throughout the length of the pump-barrel.

In the piston $V^2$ a screw-threaded circular opening is formed centrally, into which the rod V′ is screwed. The pump-barrel has an elliptical section and the piston has a corresponding shape, so that when the rod V′ rotates the piston, being unable to turn with it, will move forward or backward upon the rod, according to the direction of the rotation of the latter.

To the pump-barrel V is fixed the support $v$, which serves as a support for the piece Y. In this support $v$ is formed a conduit or duct $v'$, extending from the pump to the top of the said support, which conduit or duct conveys the gum thereto when the piston $V^2$ advances on its rod V′. A ratchet-wheel T is keyed upon the end of the rod V′ outside the upright X′, which end of the said rod serves likewise as a pivot for the lever S′, to which is pivoted a pawl S, the extremity of which can engage with the wheel T. This pawl rests upon the bent lower end of a rod $s$, fixed at the top to the front arm of the lever R. At the end of the shaft B and outside the upright X′ is fixed an adjustable link-shaped arm U, which turns with the shaft B.

When pressure is applied to the front end of the lever R, the rod $s$ is lowered and the pawl S and the lever S′ are likewise depressed by gravity. The arm U in turning then meets the end of the lever S′, which it raises in order to pass under it. On account of its upward motion the lever S′ will push the pawl S toward the wheel T, which pawl becoming engaged with the teeth of the said wheel causes it to turn one or more teeth, according to the distance to which the arm U has been adjusted. The rod V′ turns with the wheel T and its rotation causes the piston $V^2$ to advance and to force out of the opening of the duct $v'$ a small quantity of the gum contained therein and in the pump-barrel.

The lever R and its connections constitute the starter for the tip-former and the pump. After being started the tip-former is further propelled by the main driving mechanism, as explained. The starter itself controls the feed of gum from the gum-pump.

A plate W covers the front of the pump-barrel and extends as far as the manipulators, allowing the workman to rest his hands thereon in order to introduce and guide into the said manipulators the tobacco-leaf with which the fillings are to be enveloped.

The machine works as follows: The operator first raises the handle O until its extension bears against the projection $r'$ of the lever R. The toothed wheels $k$ $k'$ are thereby caused to turn the cam-plates K K′ forward, the spindle M′ descending in the slots of its guides and in the lower part of the slots L L′ and the two pairs of manipulators being opened and stopped through the disconnecting of the pulley A. The operator then places in the manipulators the tobacco intended to form the fillings of the cigar, which filler is preferably the usual rough-molded filler, well known by cigar-makers. After the manipulators have operated on the filler to the extent desired, as seen by the workman, the workman then lowers handle O. The connection of the pulley A with the shaft B being then effected by the eccentric $O^2$ and the forked lever $O^3$, the shaft B imparts motion to the wheels D D′, which cause the wheels E E E′ E′ and their plates F F F′ F′ to turn, whereby the spindles H H′, the guides I I′ $I^2$ $I^3$, the spindle M M′, and the manipulators $n$ $n'$ $n^2$ $n^3$ are set in motion, the latter rolling the fillings while molding them to the required shape. The small knife $z$ moves constantly up and down under the action of the spindle M′. At the proper time, as seen by the operator, the lever R being held slightly lowered, the movable half $y$ of the tip-former becomes disengaged from its stop-piece $e'$ and through the medium of the guide $d$ is set in motion by the spindle H′ and strikes and molds or shapes the tip of the fillings. When the workman considers that the fillings are sufficiently molded, he releases the lever R, takes the cut leaf which is to form the wrapper for the cigar and introduces it by one end between the compressed fillings and the manipulators near the thick end of the fillings. The motion of the manipulators causes the leaf to enter the machine as fast as the fillings turn, the workman guiding the same so that it may be properly wound and holding it toward the tip. When the leaf comes near the tip, the small knife 2 cuts a slit in the edge of the wrapper. Again the workman presses lightly on the lever R in order to set the movable half $y$ of the tip-former in motion, and thus facilitate the insertion of the leaf in the tip-former, and afterward presses more forcibly on the said lever R for the purpose of actuating the pawl S, the wheel T, and the rod V′ and moving forward the piston of the pump and bringing a little gum to the opening of the duct $v'$ under the end of the leaf, which he holds against the front plate W. He then ceases to press on the lever R, thereby stopping the movable half $y$ of the tip-former, and the end of the leaf entering the mold or tip-former it is wound around the tip of the cigar, imparting thereto the form of the mold. After having allowed the manipulators to operate a little longer, so as to properly mold the cigar, the workman raises the crank-handle O by a single movement to the end of its stroke. The driving part of the machine then stops, the rear pair of manipulators open, the knife P descends, and, passing through a slit in the extreme tongues of the closed pair, cuts the cigar to the required length. The said knife is afterward raised by the action of its spring and the second pair of manipulators opens. Toward the end of the motion of the crank-handle the lug $k^2$ on the periphery of the cam-plate K′ raises the pair of levers Q′ Q′, which pass between the manipulators and remove the cigar, which the workman has then only to place in the box.

The manipulators are preferably fixed to their levers by screws, which allows of cigars of various forms being made in the same machine, and even cigarettes when they are wrapped up in a tobacco-leaf. In this case it suffices to secure to the levers manipulators of the required shape and dimensions and to adjust the knife on its axis so that it may cut the cigars or cigarettes to the required length.

What I claim as my invention, and desire to secure by Letters Patent, is—

1. A cigar-making machine characterized by the combination of a mold formed of two crossed pairs of jaws with means for operating the said two crossed pairs of jaws to alternately open and close them for shaping the body of the cigar and wrapping the outer leaf thereon, a movable knife which cuts off the excess of tobacco at the point end of the fillings, a tip-former consisting of a fixed and a movable part for shaping and polishing the said end, a knife for cutting off the cigars to the desired length, a pump for conveying the gum to the tip, a device for removing the finished cigar from the jaws, and disconnecting mechanism allowing of the machine being almost instantaneously stopped the whole substantially as herein described and illustrated in the accompanying drawings.

2. The mechanism for actuating the jaws or manipulators characterized by the combination with the said manipulators of rotating plates F F′, spindles H H′ connecting said plates, levers N N′ $N^2$ $N^3$ carrying the manipulators and guides I, $I^3$, and I′ $I^2$, the said levers and guides having slots formed in their lower part through which pass and work the spindles H H′, spindles M M′ constituting the fulcra of the levers N N′ $N^2$ $N^3$ and also passing through the guides I $I^3$, and I′, $I^2$, pivots J, J′ on the uprights X X′, carrying the said guides I, $I^3$, and I′ $I^2$, and plates K K′, mounted on the pivots J, J′ and having curvilinear slots formed in them, in which the ends of the spindles M, M′ rest, substantially as hereinbefore described and illustrated in the accompanying drawings.

3. The mechanism for opening one pair of jaws while the other is open and the machine is at rest characterized by the combination with the pair of jaws *n n′* which is closed at the time of stoppage, of a pair of guides I $I^3$ having slots formed in their upper part, a spindle M passing through said slots, a pair of toothed cam-plates K K′, cam-grooves L L′ in the said cam-plates into which rest the ends of the spindle M and toothed wheels *k k′* gearing with the cam-plates K K′, a shaft O′, on which are keyed the toothed wheels *k*, *k′*, and a crank-handle O, actuating the shaft O′, substantially as hereinbefore described and illustrated in the accompanying drawings.

4. The mechanism for throwing out of gear and stopping the machine characterized by the combination of a wheel $O^2$ a shaft carrying said wheel, a crank-handle on said shaft a helicoidal groove being formed in the periphery of the said wheel, a lever $O^3$ oscillating on a pivot $O^4$ the upper arm of which lever is engaged in the said helicoidal groove and the lower arm of which said lever is furnished with a fork a driving-pulley A the upper part of which turns between the branches of said fork, a clutch one half of which is carried by the driving-pulley and the other half of which is keyed on the driving-shaft of the machine, a fly-wheel, spring-actuated crank-bars *c′* mounted in the said fly-wheel and forming projections upon its inner face, and vibratory catches or tumblers $c^4$ upon said inner face, pivots $c^5$ upon which turn the said catches, or tumblers and stops $c^6$ $c^7$ to limit the motion of said catches, or tumblers, substantially as hereinbefore described and illustrated in the accompanying drawings.

5. The mechanism for operating the knife which cuts off the excess of tobacco at the tip of the fillings characterized by the combination with the said knife of a vibratory lever *z′* carrying the said knife and having a slotted downward extension $z^2$, of a spindle M′ passing through the slot in the said extension $z^2$, plates K K′ having curvilinear slots formed in them in which rest the ends of the said spindle M′, guides I′ $I^2$ on pivots J, J′, carried by the uprights X X′, and through which passes the spindle M′, and means such as a spindle H′ and rotating plate F′ F′ connected together by said spindle, connecting rotating plates F F′ for imparting oscillatory motion to the guides I′ $I^2$ and spindle M′ substantially as hereinbefore described and illustrated in the accompanying drawings.

6. The mechanism for operating the knife by which the thick end of the cigar is cut to the desired length characterized by the combination of a sleeve carrying the said knife, a shaft actuated by a crank-handle on which the said sleeve is loosely mounted, a cam-shaped sleeve keyed on the same shaft by the side of the loose sleeve, a curved pawl pivoted to the side of the loose sleeve and engaging with the cam-shaped fixed sleeve, a stop for the said pawl and a spring for raising the knife again after it has been lowered substantially as hereinbefore described and illustrated in the accompanying drawings.

7. The mechanism for operating the movable part of the tip-former characterized by the combination of a vibratory lever carrying the said movable part, a spring for pressing the said lever in one direction, and a spindle H′ connecting rotating plates F′ F′ against which bears a downward extension of the said lever for communicating motion thereto in the other direction substantially as hereinbefore described and illustrated in the accompanying drawings.

8. The mechanism for stopping the movable part of the tip-former characterized by the combination with the vibratory lever carrying the said movable part of an oscillating lever formed with a small shoulder, a spring for pressing the said shoulder upward against the said vibratory lever and an operating or governing lever for extending the said spring and lowering the said shouldered lever substantially as hereinbefore described and illustrated in the accompanying drawings.

9. The mechanism for extracting the finished cigar from the open jaws characterized by the combination with two crossed pairs of jaws, of a pair of levers located between the tongues of said jaws, a sleeve turning freely on a shaft and carrying the said levers, a lever fixed to the said sleeve, an oscillating cam-plate having a lug on its periphery for raising the said lever and a spring for lowering the said lever, substantially as hereinbefore described and illustrated in the accompanying drawings.

10. In a cigar-machine, manipulators consisting essentially of a plurality of pairs of jaws closing upon a common center, means for opening and closing said jaws, and means for swinging both pairs of jaws about their axis of closure, whereby material between the jaws is given a rotary movement, all combined.

11. In a cigar-making machine, the manipulators consisting essentially of a plurality of pairs of jaws, the pairs opening and closing alternately, the jaws of each pair having a swinging as well as an opening and closing movement, and means for actuating said jaws, substantially as described.

12. In a cigar-making machine the manipulators consisting essentially of a plurality of pairs of jaws provided with fingers, the fingers of one jaw extending through the spaces of the proximate jaw, the proximate fingers of the different pairs of jaws having an opening and closing, and a vibrating movement, combined with means for opening and closing and for vibrating said jaws, substantially as described.

13. A cigar-making machine characterized by the combination of a mold formed of two crossed pairs of jaws, with means to operate said jaws to alternately open and close them, and means to swing the pairs of jaws alternately about the common center, whereby material between the jaws is given a rotative movement, substantially as described.

14. A cigar-making machine having a plurality of pairs of pivoted jaws, means for opening and closing the jaws, and means for advancing or retracting the pivots of both pairs of jaws, in combination substantially as described.

15. In a cigar-making machine, a plurality of pairs of manipulator-jaws provided with curved fingers, a pair of guide-levers supporting the jaw fulcrums or pivots, means for opening and closing the jaws, and means for swinging the levers and thereby moving both the jaw fulcrums or pivots, substantially as described.

16. In a cigar-machine, a pair of slotted guide-levers swinging from fixed pivots, rotating disks and spindles carried thereby and extending into the slots in these guide-levers, a fulcrum-bar extending between the guide-jaws, manipulator-levers pivotally mounted on said fulcrum-bars, the extension of said manipulator-jaws being in the path of movement of the spindles carried by the disks.

17. In a cigar-machine, the slotted guide-levers pivotally supported in the machine, and means for swinging the same, the fulcrum-bars connected to said guide-levers, a moving piece bearing on each of said fulcrum-bars to move it in the direction of the length of the guide-levers, and the manipulator-jaws pivoted on the fulcrum-bars, in combination substantially as described.

18. In a cigar-machine, two pairs of manipulator-jaws, means for opening and closing them, and means for swinging both the jaw-pivots toward and away from a common center.

19. In a cigar-machine, two pairs of jaws and means for opening and closing them alternately on the cigar, and means for swinging the pivots of said jaws about the center on which said jaws close.

20. In a cigar-machine, the two pairs of pivoted jaws, the movable fulcrums of said jaws, and the slotted jaw-levers with the moving spindles traveling therein, and means for operating said spindles all combined substantially as described.

21. In a cigar-machine, a plurality of pairs of jaws having intermeshing fingers all closing about a common center, means for opening and closing the jaws by pairs, and means for moving all the pairs about the center of closure, all combined.

22. In a cigar-machine, a plurality of pairs of holding-jaws, means for opening and closing the pairs of jaws on a cigar alternately, and means for rotating the cigar by the jaw movement of either pair when closed on the cigar, all combined substantially as described.

23. In a cigar-machine, compressing-jaws, mechanical means for opening and closing and for swinging said jaws about an operative center in which the cigar is contained, a stop mechanism by which the jaw-operating gear is disconnected, and a delivery-arm operated by the stop mechanism to lift the cigar from the jaws, in combination substantially as described.

24. In a cigar-machine, the compressing-jaws, means for operating the same, means for opening all the jaws, and a delivery device automatically operating to remove the cigar from the jaws, all combined.

25. In combination with the manipulator-jaws and their guide-levers, a spindle connecting said guide-levers and acting on a pair of jaws, cam-plates operating on said spindle, and a rotating shaft operated by a separate power to turn said cam-plates and thereby move the spindle relatively to the guide-levers and control the jaw movement, substantially as described.

26. In a cigar-machine, the pairs of manipulator-jaws, means for opening and closing them on a cigar and means for swinging the jaws, and a separate train of mechanism connected to one pair of the jaws and operating to simultaneously disconnect the normal opening and closing mechanism and to open this pair of jaws all combined substantially as described.

27. In a cigar-machine, the manipulator-jaws closing on the cigar, actuating means therefor, a separate actuating mechanism engaging the jaw-actuating means to disconnect the same and open the jaws, and a delivery device controlled by the actuator to deliver the cigar from the opened jaws, substantially as described.

28. In a cigar-machine, the manipulator-jaws, a delivery device acting to remove the cigar from the jaws, and an actuator connecting to the delivery device, in combination.

29. The combination, in a cigar-machine, of cigar-forming jaws, means for operating and opening said jaws, and a delivery device acting to lift the cigar from said jaws when open.

30. In a cigar-machine, the manipulator or forming jaws, means for operating the same, delivery-levers entering between the manipulator-jaws, and an actuating-train operating to raise and depress said delivery-levers, in combination substantially as described.

31. In a cigar-making machine, a plurality of pairs of manipulator-jaws, means for opening and closing the same, and for turning the cigar by jaw movement, a delivery device, and an actuator connected thereto, and a clutch controlled by this actuator and operating to open the jaws and operate the delivery device, all combined substantially as described.

32. In a cigar-machine, the manipulator-jaws, driving-gear therefor, means for throwing the driving-gear out of operative connection with the jaws, and a brake operating to check the movement of the driving-gear when disconnected, the specified elements combined substantially as described.

33. In a cigar-machine, the manipulator-jaws, operating means therefor, an actuator having connection to the jaw-operating means to disconnect the same, and a brake operating to stop the jaw-operating means when disconnected, all combined substantially as described.

34. In a cigar-machine, the combination of the manipulator-jaws, and a cutter operating to sever the thick end of the cigar while in the jaws and a mechanical actuator for said cutter, substantially as described.

35. In a cigar-machine, the manipulator-jaws and means for operating them, a cutter operating to sever the cigar end while in the jaws, and an actuator for moving the cutter and at the same time disconnecting the driving means, substantially as described.

36. In a cigar-machine, the manipulator or forming jaws, the delivery device and the end-cutter, and the actuator and train of adjunctive mechanism operating on and serving to propel the end-cutter and then operate the delivery-lever, in combination substantially as described.

37. In a cigar-machine, a plurality of pairs of manipulating-jaws, means for opening and closing said jaws, and for rotating a cigar within the jaws by the jaw movement, and a tip-cutter in proximity to the jaws, and a mechanical actuator for such tip-cutter, all combined substantially as described.

38. The combination with the manipulator-jaws, means for opening and closing said jaws and for rotating a cigar in the jaws by jaw movement, of a tip-former at the end of said jaws, and means for closing the tip-former onto the cigar, all combined substantially as described.

39. In a cigar-machine, the tip-former consisting essentially of a plurality of pieces composing a tip-mold, means for automatically closing this mold on the cigar, and means for rotating the cigar with its tip in such mold, all combined.

40. In a cigar-machine, a plurality of pairs of manipulating-jaws, means for opening and closing the pairs of jaws alternately onto an inclosed cigar, means for rotating the inclosed cigar by the jaw movement, a separable tip-mold, and means for closing one part of the tip-mold onto the other and onto the cigar-tip while the cigar is in the jaws, the specified mechanical elements in combination substantially as described.

41. In a cigar-machine, the cigar-holding jaws, the separable tip-former in proximity to such jaws and having one concave portion connected to a gum-duct, and having another concave portion supported by a lever and operated by power mechanism to close on the first-mentioned concave portion, the specified mechanical elements and their necessary adjunctive connections in combination, substantially as described.

42. In a cigar-machine, a pair of jaws and means for opening and closing the same whereby the jaws may close onto the body of a cigar, a separate tip-former in proximity to the jaws and means for closing said tip-former onto the tip of a cigar while the cigar-body is in the manipulator-jaws, and means for moving the jaws to rotate a contained cigar while the tip of said cigar is in the tip-former, all combined substantially as described.

43. In a cigar-machine, the separable tip-former having one member connected to a gum-pump, another member connected to driving swinging jaws serving as means for closing it upon the cigar-tip, and means for rotating the cigar with its tip in the tip-former, the specified elements and their necessary adjunctive mechanism operating in combination substantially as described.

44. In a cigar-machine, the manipulator-jaws and means for operating them whereby the cigar is rotated by the jaw movement, the separable tip-former and means for moving it upon the cigar-tip, and the starter connecting to the tip-former to throw it into operation when impelled by the operator, substantially as described.

In testimony whereof I affix my signature in presence of two witnesses.

JEAN REUSÈ.

Witnesses:
H. ZUROTH,
DENY. ZEISTRAEM.